US010532909B2

(12) United States Patent
Richmond et al.

(10) Patent No.: US 10,532,909 B2
(45) Date of Patent: Jan. 14, 2020

(54) ELEVATOR PASSENGER TRACKING CONTROL AND CALL CANCELLATION SYSTEM

(71) Applicant: OTIS ELEVATOR COMPANY, Farmington, CT (US)

(72) Inventors: Stephen K. Richmond, Hartford, CT (US); Alan Matthew Finn, Hebron, CT (US); Arthur Hsu, South Glastonbury, CT (US); Hui Fang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 342 days.

(21) Appl. No.: 15/523,839

(22) PCT Filed: Sep. 3, 2015

(86) PCT No.: PCT/US2015/048279
§ 371 (c)(1),
(2) Date: May 2, 2017

(87) PCT Pub. No.: WO2016/073067
PCT Pub. Date: May 12, 2016

(65) Prior Publication Data
US 2017/0327344 A1 Nov. 16, 2017

Related U.S. Application Data

(60) Provisional application No. 62/145,095, filed on Apr. 9, 2015, provisional application No. 62/074,246, filed on Nov. 3, 2014.

(51) Int. Cl.
*G05B 15/00* (2006.01)
*B66B 5/00* (2006.01)
(Continued)

(52) U.S. Cl.
CPC .......... *B66B 5/0012* (2013.01); *B66B 1/2408* (2013.01); *B66B 1/468* (2013.01);
(Continued)

(58) Field of Classification Search
CPC ..... B66B 5/0012; B66B 1/468; B66B 1/2408; B66B 1/3476; B66B 2201/4661; B66B 2201/4607; B66B 2201/4638
(Continued)

(56) References Cited

U.S. PATENT DOCUMENTS

| | | | |
|---|---|---|---|
| 4,662,479 | A | 5/1987 | Tsuji et al. |
| 5,258,586 | A | 11/1993 | Suzuki et al. |

(Continued)

FOREIGN PATENT DOCUMENTS

| | | | |
|---|---|---|---|
| CN | 101356108 | A | 1/2009 |
| CN | 100568959 | C | 12/2009 |

(Continued)

OTHER PUBLICATIONS

Office Action for Chinese Application No. 201580059792.2; Application Filing Date Sep. 3, 2015; dated Oct. 9, 2018 (24 pages).

(Continued)

*Primary Examiner* — Jeffrey Donels
(74) *Attorney, Agent, or Firm* — Cantor Colburn LLP

(57) ABSTRACT

A passenger conveyance passenger tracking control system that controls operation of a passenger conveyance, e.g., an elevator car, includes at least one call request device, e.g., a call request panel, configured to receive at least one input from at least one passenger located at a occupancy depth grid. At least one passenger position three-dimensional (3-D) depth-sensing sensor is configured to track a position of the at least one passenger located at the occupancy depth grid. The passenger conveyance passenger tracking control system further includes an electronic control module in
(Continued)

signal communication with the at least one call request device and at least one passenger position 3-D depth-sensing sensor. The electronic control module is configured to control operation of the passenger conveyance based on the position of the at least one passenger.

11 Claims, 12 Drawing Sheets

(51) Int. Cl.
*B66B 1/24* (2006.01)
*B66B 1/46* (2006.01)

(52) U.S. Cl.
CPC ................ *B66B 2201/4607* (2013.01); *B66B 2201/4661* (2013.01)

(58) Field of Classification Search
USPC ........................................................ 187/247
See application file for complete search history.

(56) References Cited

U.S. PATENT DOCUMENTS

| | | | | |
|---|---|---|---|---|
| 5,298,697 | A | 3/1994 | Suzuki et al. | |
| 5,387,768 | A | 2/1995 | Izard et al. | |
| 6,109,396 | A | 8/2000 | Sirag et al. | |
| 7,063,189 | B2 | 6/2006 | Curzon et al. | |
| 7,712,586 | B2 | 5/2010 | Legez | |
| 8,584,811 | B2 | 11/2013 | Kuoppala et al. | |
| 8,684,142 | B2 | 4/2014 | Finschi | |
| 10,017,355 | B2 * | 7/2018 | Silvennoinen | B66B 1/468 |
| 10,045,004 | B2 * | 8/2018 | Hsu | B66B 1/2408 |
| 10,055,657 | B2 * | 8/2018 | Fang | B66B 1/2408 |
| 10,282,720 | B1 * | 5/2019 | Buibas | G06Q 20/18 |
| 2006/0037818 | A1 * | 2/2006 | Deplazes | B66B 1/3476 187/392 |
| 2009/0057068 | A1 * | 3/2009 | Lin | B66B 1/34 187/392 |
| 2012/0234631 | A1 * | 9/2012 | Hsieh | B66B 3/002 187/247 |
| 2013/0133986 | A1 | 5/2013 | De Vincentis et al. | |
| 2016/0291558 | A1 * | 10/2016 | Finn | B66B 1/468 |
| 2016/0368732 | A1 * | 12/2016 | Zhao | B66B 1/3476 |
| 2017/0233220 | A1 * | 8/2017 | Scoville | B66B 5/0012 705/7.29 |
| 2019/0016557 | A1 * | 1/2019 | Baldi | B66B 1/2408 |

FOREIGN PATENT DOCUMENTS

| | | | |
|---|---|---|---|
| CN | 102046506 | A | 5/2011 |
| EP | 2295361 | A1 | 3/2011 |
| JP | H09278301 | A | 10/1997 |
| JP | 2010111444 | A | 5/2010 |
| WO | 2008013515 | A2 | 1/2008 |
| WO | 2013182739 | A1 | 12/2013 |
| WO | 2014096529 | A1 | 6/2014 |

OTHER PUBLICATIONS

International Search Report for PCT/US2015/048279, dated Nov. 19, 2015, 3 pages.

* cited by examiner

ELEVATOR PASSENGER TRACKING CONTROL AND CALL CANCELLATION SYSTEM

CROSS REFERENCE TO RELATED APPLICATIONS

This application is a National Stage application of International Patent Application Serial No. PCT/US2015/048279, filed Sep. 3, 2015, which claims benefit to U.S. Provisional Application No. 62/145,095, filed Apr. 9, 2015 and U.S. Provisional Application 62/074,246, filed Nov. 3, 2014, which are incorporated herein by reference in their entirety.

TECHNICAL FIELD

This present disclosure relates generally to passenger conveyance control systems, particularly elevator control systems, and specifically, to detecting and tracking a passenger to control a passenger conveyance, especially an elevator system.

BACKGROUND

Elevator call cancellation performed by conventional elevator control systems are limited to a condition where all waiting passengers leave the elevator area of conventional two input (up or down) call systems. Moreover, conventional elevator systems may include video cameras that monitor presence of passengers in an elevator. These conventional video cameras, however, provide only two-dimensional (2-D) images and fail to adequately determine depth and thus do not adequately determine the volume of a passenger tracking area. For instance, 2-D imaging provided by conventional 2-D video cameras consists of successive captured 2-D images which include reflected color (i.e., a mixture of wavelengths) from the first object in each radial direction. Thus, the 2-D images are essentially a 2-D projection of the 3D world where each pixel is the combined spectrum of the source illumination and the spectral reflectivity of an object in the scene. Moreover, systems based on visible spectrum 2-D cameras have limitations such as poor robustness to illumination change, glare, shadows, and occlusion. Existing 2-D video analytics algorithms are largely inadequate to mitigate these problems. The additional information on range (but not color) makes depth sensing largely insensitive to illumination change and glare, far less sensitive to occlusion, and completely insensitive to (visible spectrum) shadows. Consequently, the use of 2-D video cameras may not properly track one or more passengers entering and/or leaving the elevator car and/or a waiting area located at the elevator hallway or landing.

SUMMARY

According to embodiment, a passenger conveyance passenger tracking control system that controls operation of a passenger conveyance comprises at least one call request device configured to receive at least one input from at least one passenger located at an occupancy depth grid. At least one passenger position three-dimensional (3-D) depth-sensing sensor configured to track a position of the at least one passenger located at the occupancy depth grid. The passenger conveyance passenger tracking control system further includes an electronic control module in signal communication with the at least one call request device and the at least one passenger position 3-D depth-sensing sensor, the electronic control module configured to control operation of the passenger conveyance based on the position of the at least one passenger.

In addition to one or more of the features described above or below, or as an alternative, further embodiments include:

a feature, wherein the electronic control module generates an occupancy depth grid identifying the position of the at least one passenger and the location of the at least one occupancy depth grid based on an electronic data signal output from the at least one passenger 3-D depth-sensing sensor, controls operation of the passenger conveyance based on the position of the at least one passenger with respect to the at least one occupancy depth grid;

a feature, wherein the at least one passenger is tracked in an area that includes a first occupancy depth grid located externally from the passenger conveyance and a second occupancy depth grid located within the passenger conveyance;

a feature, wherein the at least one passenger position 3-D depth-sensing sensor includes a first 3-D depth-sensing sensor configured to monitor the first occupancy depth grid, and a second 3-D depth-sensing sensor configured to monitor the occupancy depth grid, and wherein the control module hands off at least one data monitored by the first 3-D depth-sensing sensor to the second 3-D depth-sensing sensor when at least one passenger moves from the first occupancy depth grid to the second occupancy depth grid, and data monitored by the second 3-D depth-sensing sensor to the first 3-D depth-sensing sensor when at least one passenger moves from the second occupancy depth grid to the first occupancy depth grid;

a feature, wherein the passenger conveyance control module cancels an passenger conveyance call request based on at least one of the position of the at least one passenger with respect to the at least one occupancy depth grid, and the time period at which the at least one passenger enters a plurality of call requests;

a feature, wherein the passenger conveyance control module cancels the passenger conveyance call request in response to the at least one passenger existing outside the at least one occupancy depth grid for a predetermined time period;

a feature, wherein the passenger conveyance control module is configured to recognize a plurality of passengers located in at least one of the first occupancy depth grid and the second occupancy depth grid, and is configured to assign at least one of a passenger conveyance call request to a passenger among the plurality of passengers, a plurality of possible direct call requests to a passenger among the plurality of passengers, and an indirect call request to a passenger among the plurality of passengers that indicates a passenger's request is ambiguous as to the desired floor of the passenger;

a feature, wherein the passenger conveyance control module cancels a passenger conveyance call request based on a first position of the first passenger and a second position of a second passenger among the plurality of passengers, the first and second positions compared to the second occupancy depth grid; and a feature, wherein the passenger conveyance is an elevator.

According to another embodiment, a method of controlling at least one passenger conveyance comprises determining at least one passenger conveyance call request input by at least one passenger located in at least one occupancy depth grid via at least one call request device. The method further comprises tracking a position of the at least one passenger with respect to the at least one occupancy depth grid. The method further comprises controlling operation of the passenger conveyance based on the position of the at least one passenger with respect to the at least one occupancy depth grid.

In addition to one or more of the features described above or below, or as an alternative, further embodiments include:

a feature of receiving an electronic data signal from the at least one passenger 3-D depth-sensing sensor identifying the position of the at least one passenger and the location of the at least one occupancy depth grid, and controlling operation of the passenger conveyance based on the position of the at least one passenger with respect to the at least one occupancy depth grid;

a feature of monitoring a first occupancy depth grid located externally from a passenger conveyance system and monitoring a second occupancy depth grid located within the passenger conveyance, handing off at least one data monitored by a first 3-D depth-sensing sensor to a second 3-D depth-sensing sensor when at least one passenger moves from the first occupancy depth grid to the second occupancy depth grid, and data monitored by the second 3-D depth-sensing sensor to the first 3-D depth-sensing sensor when at least one passenger moves from the second occupancy depth grid to the first occupancy depth grid;

a feature of cancelling an passenger conveyance call request based on at least one of the position of the at least one passenger with respect to the at least one occupancy depth grid, and the time period at which the at least one passenger enters a plurality of call requests;

a feature of determining a time period at which the at least one passenger is outside the at least one occupancy depth grid, and cancelling the passenger conveyance call request in response to the time period exceeding a time period threshold, and recognizing a plurality of passengers located in at least one of the first occupancy depth grid and the second occupancy depth grid, and assigning at least one of a passenger conveyance call request to a passenger among the plurality of passengers, a plurality of possible call requests to a passenger among the plurality of passengers, and an indirect call request to a passenger among the plurality of passengers that indicates a passenger's request is ambiguous as to the desired floor of the passenger; and a feature of determining a first position of the first passenger with respect to the second occupancy depth grid, and determining a second position of a second passenger among the plurality of passenger with respect to the second occupancy depth grid, and cancelling an passenger conveyance request based on a comparison between the first and second positions, and the second occupancy depth grid.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As used herein, the term module refers to a hardware module including one or more of an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1A:
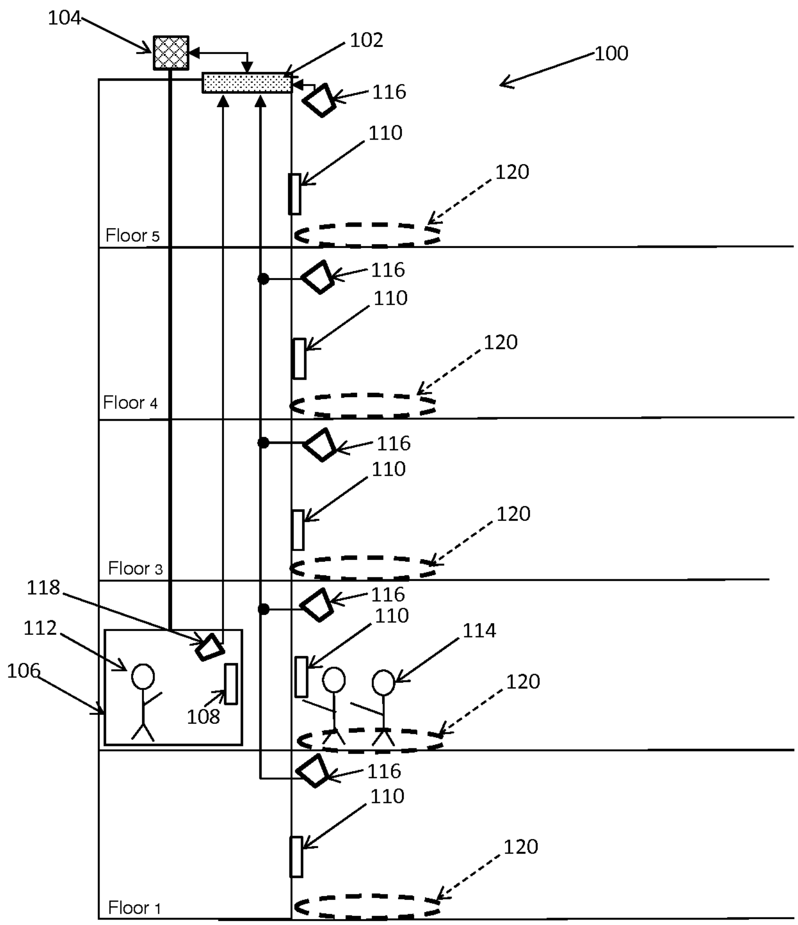
FIG. 1A is a block diagram illustrating an elevator passenger tracking control system according to a non-limiting embodiment.

Referring to FIG. 1A, an elevator passenger tracking control system 100 is illustrated according to a non-limiting embodiment. The elevator passenger tracking control system 100 includes an electronic elevator control module 102, and an elevator car driving assembly 104. The elevator car driving assembly 104 includes a machine that imparts movement to elevator car 106. The elevator control module 102 includes an electronic microcontroller, for example, configured to output one or more electrical signals capable of controlling the operation of the elevator car driving assembly 104 and the elevator car 106 as understood by one of ordinary skill in the art.

The elevator passenger tracking control system 100 further includes an elevator car control device 108 and one or more call control devices 110. The elevator car control device 108 is in electrical communication with the elevator control module 102 and receives one or more command signals input by a current passenger 112 indicating a desired floor at which to deliver the elevator car 106. The call control device 110 is installed at a respective floor landing and is configured to call an elevator car 106 to a particular floor occupied by one or more potential passengers 114. The call control device 110 can be configured as a dual input (e.g., up or down) call control device which requests an elevator car for up or down movement by a potential passenger 114, or a multi-floor call control device which directly indicates a desired floor at which to deliver a passenger without requiring the potential passenger 114 to be located within the elevator car 106. For example, one or more potential passengers 114 located on floor 2 can utilize the call control device 110 to both call the elevator car 106 and also indicate that floor 5 is their desired destination without the need to physically enter the elevator car 106.

The elevator passenger tracking control system 100 further includes one or more landing sensors 116 and one or more elevator car passenger sensors 118. According to a non-limiting embodiment, the landing passenger sensors 116 and the elevator car passenger sensors 118 are configured to output an electrical signal that can be processed by the electronic elevator control module 102 to track one or more passengers and/or potential passengers. The landing passenger sensors 116 and the elevator car passenger sensors 118 include, but are not limited to, three-dimensional (3-D) depth-sensing sensors 116-118. Unlike conventional 2-D cameras, the volumetric data corresponding to the sensed depth is typically referred to as a depth map, point cloud, or occupancy depth grid 117*a*-117*b* which provides depth data (e.g., volumetric data) that is different from that of a typical electronic image provided by a conventional 2-D camera.

The 3-D depth-sensing sensors 116-118 typically exclude color (spectral) information. Instead, each voxel (volume element) 119 associated with the occupancy depth grids 117*a*-117*b* generated by the 3-D depth-sensing sensors 116-

Figure 1B:
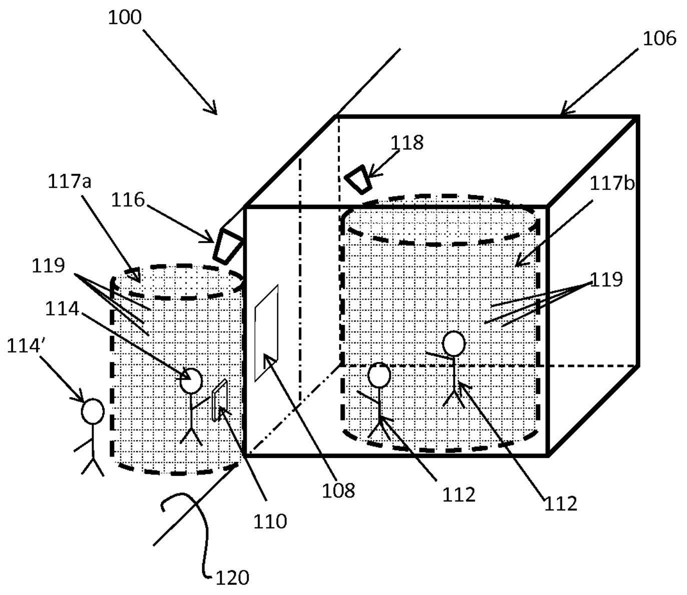
FIG. 1B illustrates a position of elevator passengers with respect to three-dimensional (3-D) occupancy grids generated by the elevator passenger tracking control system according to a non-limiting embodiment.

118, respectively, is the distance (depth, range) to the first reflective object (e.g., tracked current passenger 112 or tracked potential passenger 114) in each radial direction from the 3-D depth-sensing sensors 116-118. (see FIG. 1B). Although the occupancy depth grids 117*a*-117 are illustrated as cylindrical volumes, the shapes of the occupancy depth grids 117*a*-117 are merely exemplary and can include various different shapes and sizes. In particular, the grid voxels need not be uniform in size.

According to a non-limiting embodiment, the occupancy depth grids 117*a*-117 produced by the 3-D depth-sensing sensors 116-118 generate one or more 3-D voxels, where each voxel is denoted as occupied or not. In this manner, a passenger can be deemed, for example, a potential passenger 114 or current passenger 112 located, within a respective occupancy depth grid 117*a*-117*b*, or a potential passenger 114' who has left a respective occupancy depth grid 117*a*-117*b*. The 3-D depth-sensing sensors 116-118 are configured to operate according to various multi-depth sensing technologies including, but not limited to, structured light, phase shift, time of flight, stereo triangulation, sheet of light triangulation, light field sensors, coded aperture cameras, computational imaging techniques like depth from defocus, structure from motion (SFM), simultaneous localization and mapping (SLAM), imaging radar, imaging sonar, scanning LIDAR, flash LIDAR, etc. The various multi-depth technologies may also be active or passive and can be executed in various bands of the electromagnetic or acoustic spectrum.

According to a non-limiting embodiment, the elevator passenger tracking control system 100 performs 3-D tracking based on a Kalman filtering technique. The Kalman filtering technique takes into account various system state variables including, for example, a target object's real world state parameters as understood by one of ordinary skill in the art. The real work state parameters include, but are not limited to, the target object real world 3-D position (x, y, z) and the velocities of the target object in the x and y directions.

The tracking algorithm includes two operations: prediction and update. With respect to the prediction operation, a constant velocity model is applied for prediction and, through the model, targets (their states) at a known location at a previous time are predicted into a predicted location at the current time. A more complex model can be used if needed.

With respect to the update operation, first all the targets in the current frame are detected with an object detection algorithm (i.e., a depth-map-based background subtraction and foreground segmentation). The detected targets are then associated with the predicted targets based on a global optimal assignment algorithm such as, for example, Munkres Assignment Algorithm (i.e., the Hungarian algorithm). The target object's position, i.e., x, y and z (height) coordinate values, are used as features for the assignment. For a predicted target object that has an associated detected target, the target system state will be updated according to the Kalman equation with the associated detected target as the observation. For a predicted target object that has no associated detected target, the system state will stay the same but the confidence of the target object will be reduced, (e.g., if the target is already going out of the field of view). A track will be removed if the confidence becomes too small, i.e., is below a threshold value. For a detected target object that has no associated predicted target, a new track will be initialized. It is also appreciated that other tracking approaches such as, for example, particle filtering techniques, can also be applied which will be more robust in cases where the target abruptly changes velocity.

The landing passenger 3-D depth-sensing sensors 116 are configured to detect when one or more potential passengers 114 enter a first tracking area 120 at an elevator landing located externally from the elevator car 106. Once a potential passenger 114 enters the tracking area 120, the respective occupancy depth grid 117*a* including one or more potential passengers 114 is output from the landing passenger 3-D depth-sensing sensor 116 to the elevator control module 102. Thereafter, the elevator control module 102 is configured to track each potential passenger 114 with respect to the occupancy depth grid 117*a*.

The elevator car passenger 3-D depth-sensing sensor 118 operates similar to the landing passenger 3-D depth-sensing sensor 116, and is configured to detect when one or more potential passengers 114 enter the elevator car 106. An operation where the landing passenger 3-D depth-sensing sensor 116 hands off tracking to the elevator car passenger 3-D depth-sensing sensor 118 is discussed in greater detail below. Once a potential passenger 114 enters the elevator car 106, the potential passenger 114 is treated as an additional current passenger 112 and the state of the current passenger 112 with respect to the occupancy depth grid 117*b* generated by the elevator car 3-D depth-sensing sensor 118 and is output to the elevator control module 102. Thereafter, the elevator control module 102 is configured to analyze the occupancy depth grid 117*b* and track each current passenger 112 with respect to the occupancy depth grid 117*b*. Based on the position of one or more current passengers 112 and/or one or more potential passengers 114, the elevator control module 102 is configured to control operation of the elevator system 100 as discussed in greater detail below.

According to a non-limiting embodiment, the elevator passenger tracking control system 100 includes a feature of handing off tracking of one or more potential passengers 114 moving from the elevator lobby/hallway to the elevator car 106. In a similar manner, the elevator passenger tracking control system 100 includes a feature of handing off tracking of one or more current passengers 112 moving from the elevator car 106 to the elevator lobby/hallway. 3-D tracking systems typically do not include colors and 2-D projected shapes/gradients such that conventional 2-D image hand off techniques cannot be incorporated. Accordingly, the elevator passenger tracking control system 100 utilizes 3-D shape descriptors such as, for example, a Histogram of Spatial Oriented 3-D Gradients (HoSG3D).

In yet another non-preferred embodiment, the elevator passenger tracking control system 100 uses serialization of passengers entering the elevator car 106 to associate tracks, e.g., the first lost track in one sensed volume of the elevator (e.g., the occupancy depth grids 117*a*) is associated with the first newly acquired track in another sensed volume. To ensure accuracy, the elevator passenger tracking control system 100 incorporates overlapping, calibrated sensed volumes such that the position of an object (i.e., passengers 112-114) in the overlapping sensed volumes will be known to be at the same spatial position.

In another embodiment, a combination of the above techniques, or others as are well known in the art may be used. When the multiple techniques provide conflicting information on the correct track association, the ambiguity can be resolved by solving a Bayesian Estimation problem to maximize the probability of correct association given the observations and uncertainties. It will be recognized that other mathematical formulations of the association problem are possible.

Figure 2:
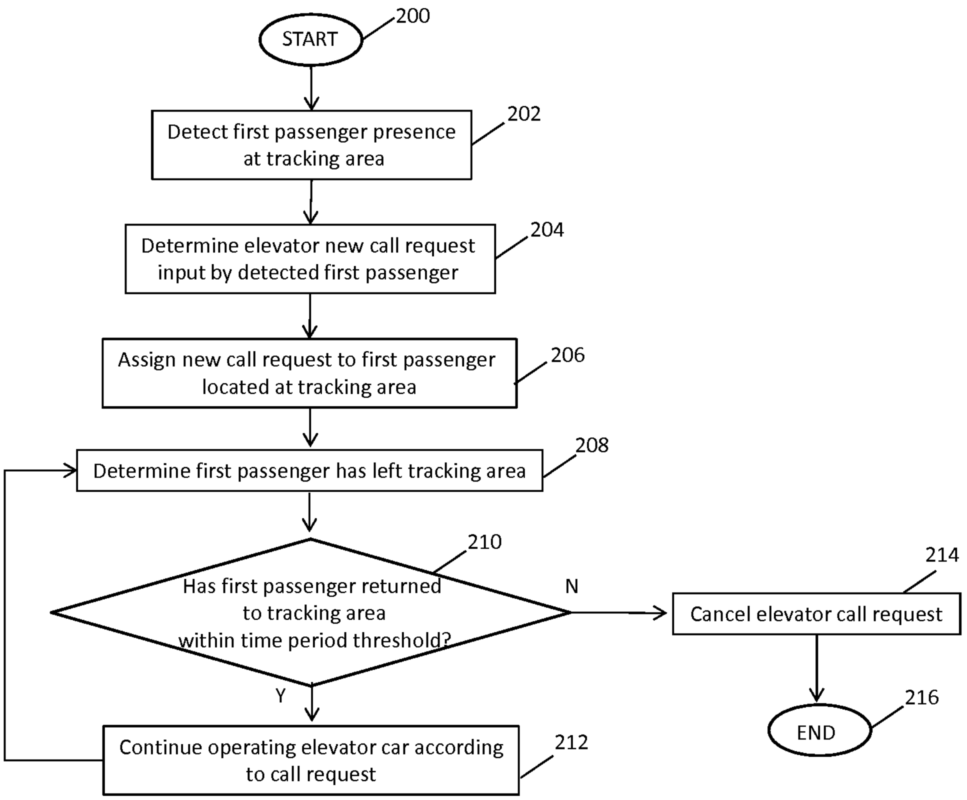
FIGS. 2-11 illustrate various methods of controlling an elevator car based on a tracked position of a passenger according to non-limiting embodiments.

Referring now to FIG. 2, a flow diagram illustrates a method of controlling an elevator system 100 based on a position of one or more current passengers and/or one or more potential passengers according to a non-limiting embodiment. The method begins at operation 200, and at operation 202 one or more potential passengers are detected to enter an occupancy depth grid 117*a* of a tracking area 120. As described above, the tracking area 120 can be, for example, an occupancy depth grid 117*a* of the elevator landing 120 that is monitored by a respective landing passenger 3-D depth-sensing sensor 116. The potential passengers 114 are continuously tracked as long they remain in the occupancy depth grid 117*a*. Once a potential passenger leaves the occupancy depth grid 117*a*, the leaving passenger 114' is no longer tracked and the elevator system 100 can take additional actions based on the leaving passenger 114' as discussed in greater detail below. The system 100 is also configured to predict that a potential passenger will ultimately leave the occupancy depth grid 117*a* based on the movements of potential passenger. In this manner, the system 100 is not required to wait for the potential passenger to completely leave the leaves the occupancy depth grid 117*a* before taking additional actions as discussed in greater detail below.

At operation 204, an initial call request input by a potential passenger is detected. The initial call request can include a direct call request that indicates an unambiguous selection of a desired floor input using a multi-input call control device 110 installed at an elevator landing 120. At operation 206, the initial call request is assigned to the potential passenger located in the occupancy depth grid 117*a*. For example, an input floor number is assigned to the potential passenger located in the occupancy depth grid 117*a*. At operation 208, the tracked potential passenger is determined to have left the occupancy depth grid 117*a*. According to an embodiment, the electronic elevator control module 102 analyzes the occupancy depth grid 117*a* and compares a position of the potential passenger tracked by one or more landing passenger 3-D depth-sensing sensor 116 with respect to the occupancy depth grid 117*a*.

At operation 210, a determination is made as to whether the potential passenger 114 has returned to the occupancy depth grid 117*a* within a period time (e.g., 10 seconds). For example, a time period at which the at least one passenger is outside the occupancy depth grid 117*a* can be compared to a time period threshold. According to an embodiment, when the tracked potential passenger has returned to the occupancy depth grid 117*a*, the elevator control module 102 continues operating the elevator car 106 according to the initial call request at operation 212 and returns to operation 208 to continue tracking the position of the potential passenger with respect to the occupancy depth grid 117*a*. A returning passenger may be distinguished from a newly arriving passenger by shape descriptors, e.g., a Histogram of Spatially Oriented 3-D Gradients (HoG3D), or other features. When, however, the potential passenger does not return to the occupancy depth grid 117*a* within the period time (e.g., 10 seconds), the initial call request is cancelled at operation 214, and the method ends at operation 216. In this manner, the elevator call status can be controlled based on the most current position of one or more potential passengers with respect to the occupancy depth grid 117*a*, thereby improving the overall operating efficiency of the elevator system 100.

Figure 3:
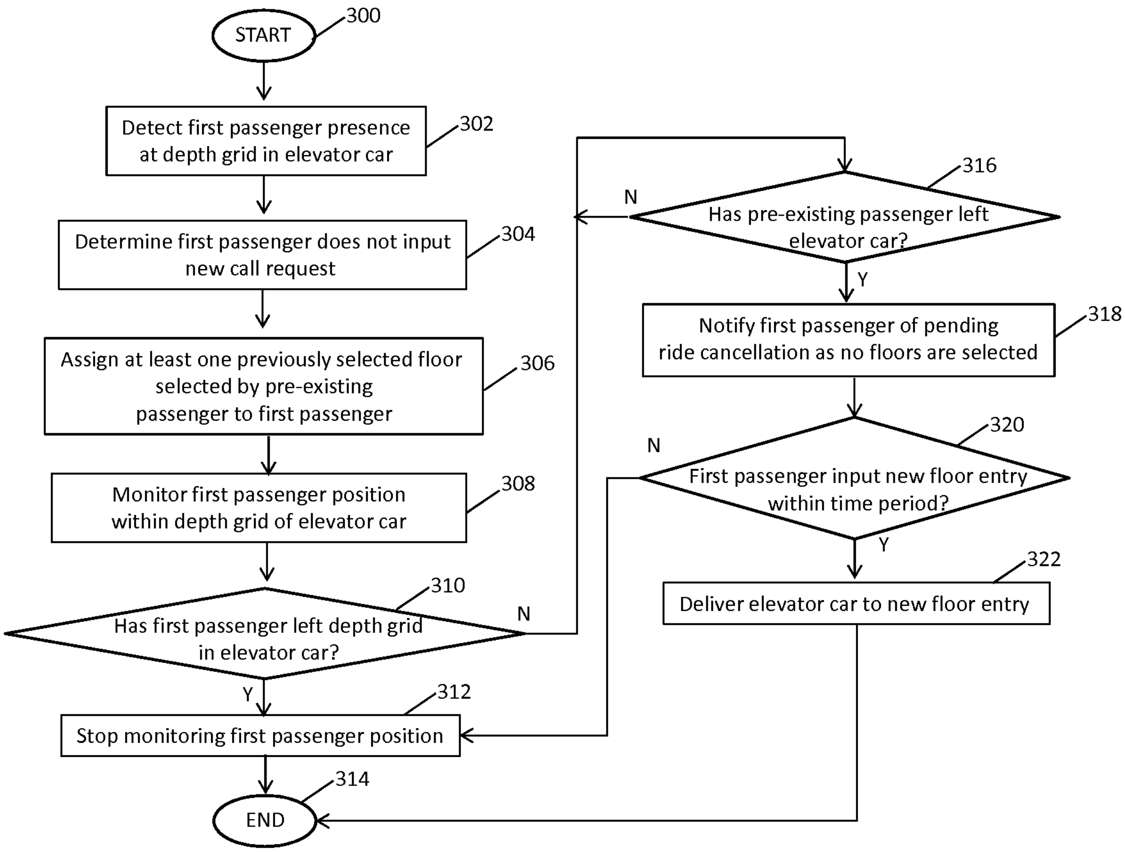

Turning to FIG. 3, a method of controlling an elevator passenger tracking control system 100 is illustrated according to another non-limiting embodiment. The method begins at operation 300, and at operation 302 one or more potential passengers are detected to enter an occupancy depth grid 117*b* monitored by an elevator car 3-D depth-sensing sensor 118 disposed within an elevator car 106. If an entering passenger has an associated floor request, e.g., via track hand-off from depth-sensing sensor 116, the elevator continues operation for this passenger. If an entering passenger does not have an associated floor request, the passenger is determined as a new current passenger. At operation 304, it is determined if the new current passenger has not input a new call request. If the new current passenger has input a request, the elevator continues normal operation for this passenger. Otherwise, at operation 306, is there is only one selected floor selected by a pre-existing current passenger, it is assigned to the new current passenger. If more than one floor has been selected by existing current passengers, a list of possible destinations is assigned as the new current passenger's destination because no unambiguous single assignment may be made. At operation 308, the position of the new current passenger is monitored with respect to the occupancy depth grid 117*b* of the elevator car 106. At operation 310, a determination is made as to whether the new current passenger has exited the elevator car 106 (e.g., the occupancy depth grid 117*b*). If the new current passenger has left the elevator car 106, the positional tracking of the new current passenger is stopped, and the method ends at operation 314.

When, however, the new current passenger has not left the elevator car 106 (e.g., the target area), a determination is made as to whether one or more pre-existing current passengers exited the elevator car 106 (e.g., occupancy depth grid 117*b*). If no pre-existing current passengers has left the elevator car 106 (e.g., occupancy depth grid 117*b*), the position of one or more pre-existing passengers continues to be monitored at operation 316. When, however, one or more pre-existing current passengers leaves the elevator car 106 (e.g., occupancy depth grid 117*b*), the list of possible destinations is reduced by eliminating the current floor where the new current passenger did not disembark. If all floors of the list are eliminated or the designation is "don't know" (as explained below), the new current passenger is notified of a pending ride cancellation at operation 318. According to an embodiment, the pending ride cancellation can be alerted using a graphic user interface/graphic display and/or a speaker that that announces the pending ride cancellation. At operation 320, a determination is made as to whether the new current passenger has entered a new floor entry within a floor entry time period at operation 320. If the new current passenger enters a new floor entry within the floor entry time period, the elevator control module 102 delivers the elevator car 106 according to the new floor entry and the method ends at operation 314. When, however, the new current passenger does not enter a new floor entry within the floor entry time period, the elevator control module 102 stops monitoring the position of the new current passenger at operation 312, and the method ends at operation 314.

Figure 4:
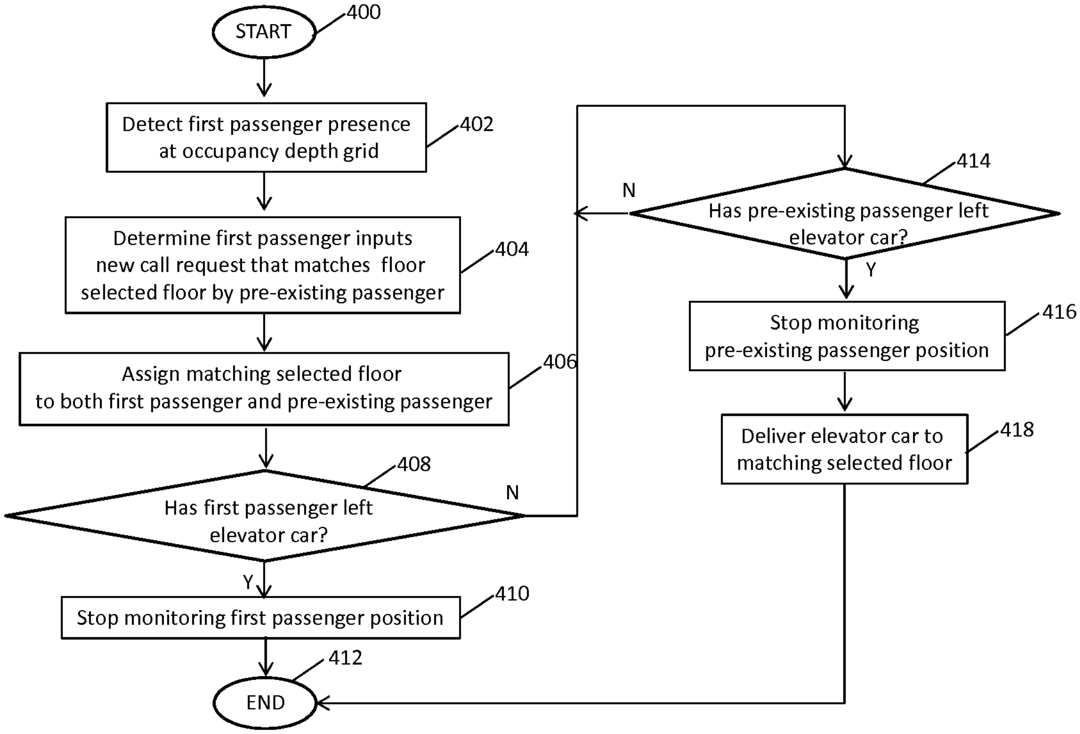

Turning to FIG. 4, a method of controlling an elevator passenger tracking control system 100 is illustrated according to another non-limiting embodiment. The method begins at operation 400, and at operation 402 a first passenger is detected entering an occupancy depth grid 117*a* at the elevator landing 120 or an occupancy depth grid 117*b* within the elevator car 106. At operation 404, the electronic elevator control module 102 determines that a new call request (e.g., a new floor input) matches a pending floor request previously input by one of potentially many pre-existing passenger(s). At operation 408, a determination is made as to whether the first passenger has exited the elevator car 106 (i.e., occupancy depth grid 117*b*). If the first passenger has exited the elevator car 106 (i.e., occupancy depth grid 117*b*), the elevator control module 102 stops monitoring the position of the first passenger at operation 410, and the method ends at operation 412.

When the first passenger does not exit the elevator car 106 (i.e., occupancy depth grid 117*b*) at operation 408, a determination is made as to whether one or more pre-existing passengers have exited the elevator car 106 (i.e., occupancy depth grid 117*b*) at operation 414. If, a pre-existing passenger has not exited the elevator car 106 (i.e., occupancy depth grid 117*b*), the method returns to operation 414 and continues monitoring the position of one or more pre-existing passengers with respect to the elevator car 106 (i.e., occupancy depth grid 117*b*). When, however, a pre-existing passenger exits the elevator car 106 (i.e., occupancy depth grid 117*b*) at operation 414, the elevator control module stops tracking the position of the pre-existing passenger at operation 416. At operation 418, the elevator control module 102 delivers the elevator car 106 to matching input floor entry, and the method ends at operation 412.

Figure 5:
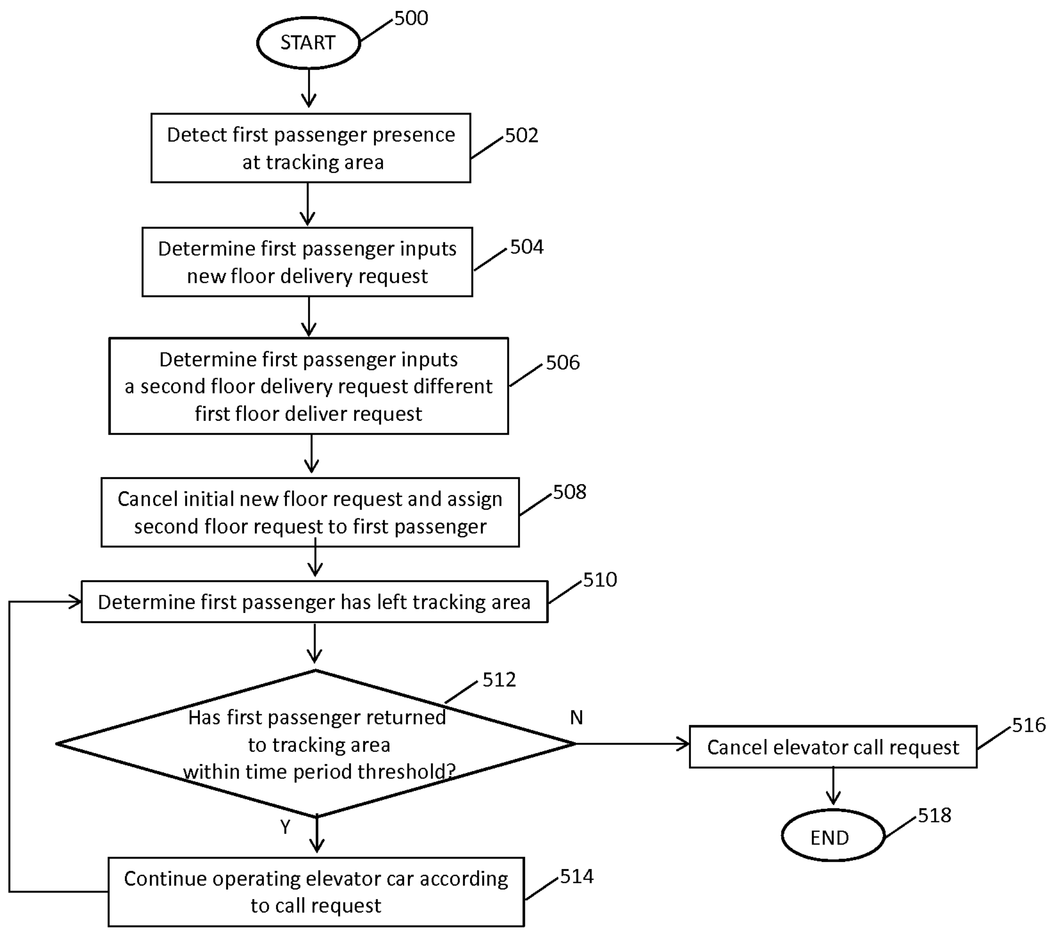

Turning to FIG. 5, a method of controlling an elevator passenger tracking control system 100 is illustrated according to another non-limiting embodiment. The method begins at operation 500, and at operation 502 a first passenger is detected entering an occupancy depth grid 117*a* at a landing area 120 or an occupancy depth grid 117*b* within an elevator car 106. At operation 504, the first passenger inputs an initial new floor delivery request. For example, the first user inputs a floor at which to deliver the elevator car 106. At operation 506, the first passenger inputs a second floor delivery request different from the first floor delivery request. At operation 508, the elevator control module 102, for example, cancels the initial new floor delivery request and assigns the second floor delivery request to the first passenger. At operation 510, the first passenger is determined to exit the occupancy depth grid. At operation 512, a determination is made as to whether the first passenger has re-entered the occupancy depth grid within a period time (e.g., 10 seconds). A returning passenger is distinguished from a newly arriving passenger by any well-known shape descriptors, e.g., a Histogram of Spatially Oriented 3-D Gradients (HoG3D), or other features. When the first passenger re-enters to the occupancy depth grid within the time period, the elevator control module 102 continues operating the elevator car 106 according to the initial or new call request at operation 514 and returns to operation 510 to continue tracking the position of the potential passenger with respect to the occupancy depth grid. When, however, the potential passenger 114 does not re-enter to the occupancy depth grid within the period time (e.g., 10 seconds), the initial or new call request is cancelled at operation 516, and the method ends at operation 518.

Figure 6:
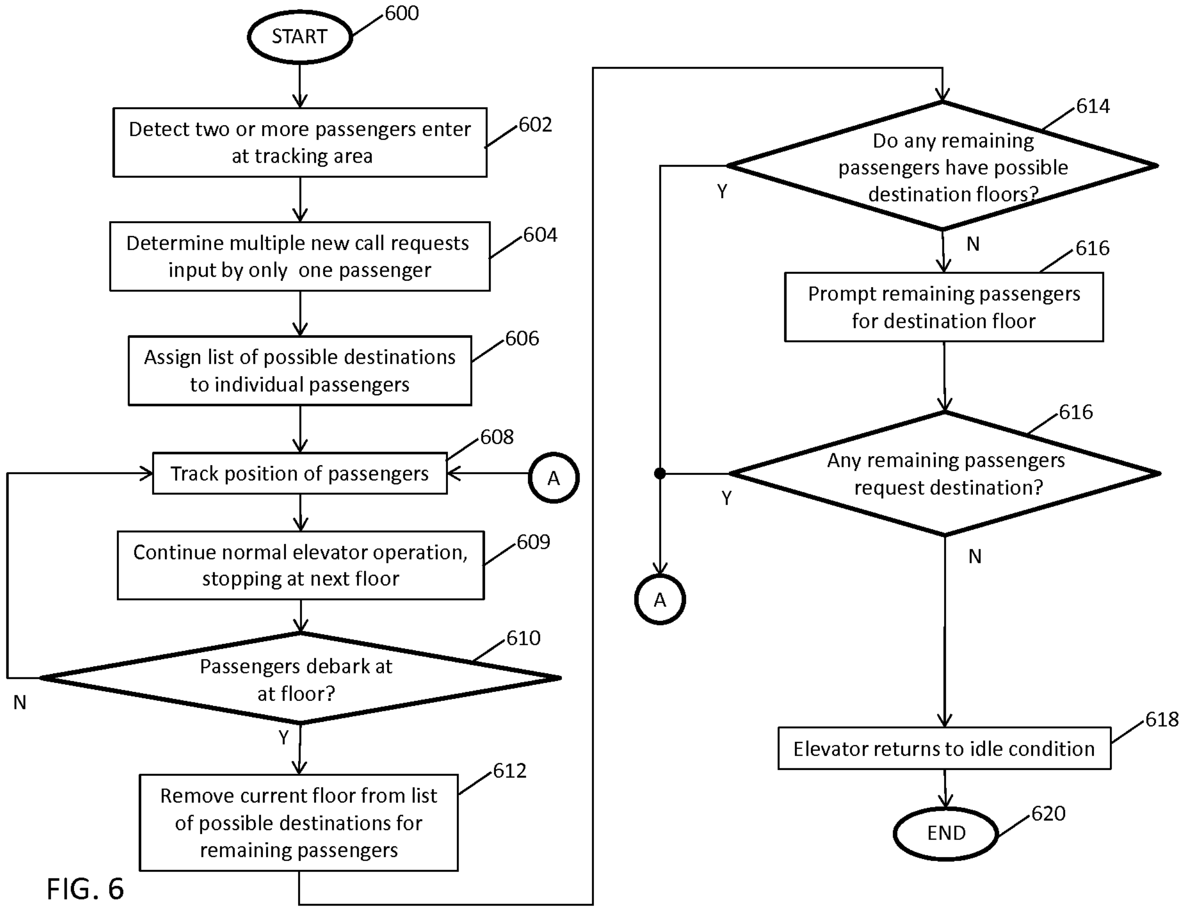

Turning to FIG. 6, a method of controlling an elevator passenger tracking control system 100 is illustrated according to another non-limiting embodiment. The method begins at operation 600, and at operation 602 two or more passengers are detected to enter an occupancy depth grid 117*a* at the landing area 120 or an occupancy depth grid 117*b* in the elevator car 106. At operation 604, multiple new call requests are detected as input by one of the two or more passengers. In such a situation, or others like it, it is ambiguous which passenger(s) want to go to witch floors. Accordingly, one or more call requests are treated as an indirect call request that indicates a passenger's request is ambiguous as to the desired floor of the passenger. In one embodiment, discussed below, the passengers are assigned a "don't know" as their selected floor. In another embodiment, discussed here, at operation 606 each passenger is assigned multiple possible destination floors as, for example, a list. At operation 608 the elevator control module 102 tracks the individual positions of the one or more passengers with respect to occupancy depth grid 117*a* at the landing area 120 or occupancy depth grid 117*b* in the elevator car 106. At operation 609, elevator car 106 is controlled in its normal operation to proceed to and stop at the next floor chosen by elevator controller module 102 from all the possible desired destination floors.

At operation 610 elevator control module 102 determines if one or more tracked passengers debark at the current floor. If no passengers debark, operation continues at operation 608. If one or more passengers debark, operation continues at operation 612. At operation 612, the current floor is removed from the list of possible destination floors for any remaining passengers who have a list of possible floors as their possible destination. In this way, any ambiguity as to a passenger's desired destination is successively reduced. At operation 612 it is possible that the list of possible destinations for a passenger will become empty, i.e., all possible destinations will have been removed from the list. At operation 614, the elevator control module 102 determines if any remaining passengers have possible destination floors. If there are such passengers, operation returns to operation 608. Otherwise, the operation continues at operation 616.

At operation 616 the remaining passengers are prompted for their desired destination floor(s). This prompt may be by any common means of passenger communication such as visible displays or audible output devices that are part of elevator passenger tracking control system 100, or may be by other common means of communication such as cellular phone, text message, etc. as appropriate and possible. At operation 616, it is determined if any remaining passengers have requested destination floors. If so, operation returns to operation 608. If not, the elevator returns to an idle state as is normally commanded by elevator control module at operation 618, and the method ends at operation 620.

In an alternate embodiment, at operation 606, the elevator control module 102 assigns a first call request to a first passenger and assigns the remaining call requests to the remaining passengers detected in the occupancy depth grid.

Figure 7:
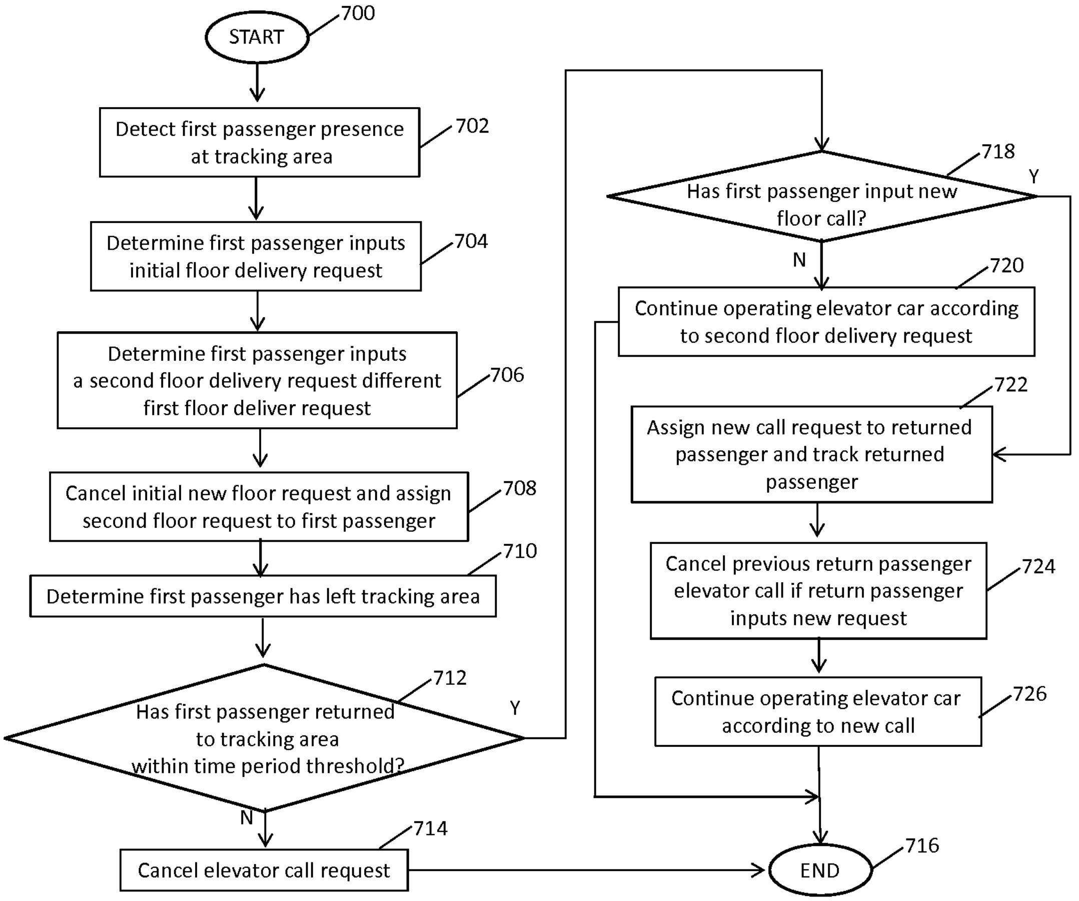

Turning now to FIG. 7, a method of controlling an elevator passenger tracking control system 100 is illustrated according to yet another non-limiting embodiment. The method begins at operation 700 and a first passenger is detected at an occupancy depth grid 117*a* at a landing area 120 or an occupancy depth grid 117*b* within the elevator car 106 at operation 702. At operation 704, the first passenger inputs an initial floor delivery request. At operation 706, the first passenger inputs a second floor delivery request different from the first delivery request. At operation 708, the initial floor delivery request is cancelled and the second floor delivery request is assigned to the first passenger. At operation 710, the first passenger exits the occupancy depth grid. At operation 712, a determination is made as to whether the first passenger has re-entered the occupancy depth grid within a time period (e.g., 10 seconds). If the first passenger does not re-enter the occupancy depth grid within the time period, the elevator control module 102 cancels the second floor delivery request at operation 714, and the method ends at operation 716.

When the first passenger re-enters to the occupancy depth grid at operation 712, a determination is made as to whether the first passenger inputs a new call request at operation 718.

If the first passenger does not input a new call request, the elevator control module 102 continues operating the elevator car 106 according to the second floor delivery request at operation 720, and the method ends at operation 716. If, however, the first passenger inputs a new call request at operation 718, the elevator control module 102 assigns the new call request to the returned passenger and tracks the position of the returned passenger with respect to the occupancy depth grid at operation 722. If the returning passenger inputs a new call request, then the returning passenger's previously input call request is cancelled at operation 724. At operation 726, the elevator control module 102 operates the elevator car 106 according to the new call request, and the method ends at operation 716.

Figure 8:
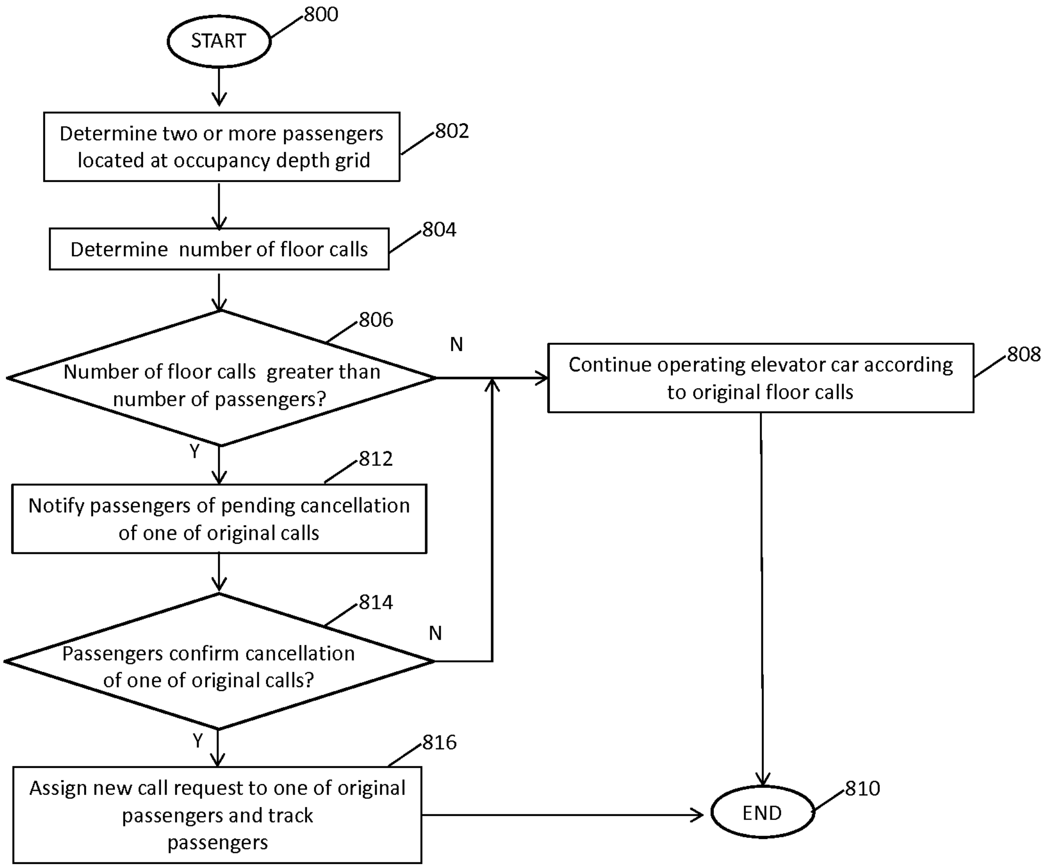

Referring to FIG. 8, a method of controlling an elevator passenger tracking control system 100 is illustrated according to another non-limiting embodiment. The method begins at operation 800, and at operation 802 two or more passengers are detected at occupancy depth grid 117*a* of an elevator landing 120 or an occupancy depth grid 117*b* in an elevator car 106. At operation 804, the total number of floor calls is determined. At operation 806, the number of passengers is compared to the number of floor calls. When the number of floor calls is less than or equal to than the number of passengers, the elevator control module 102 continues operating the elevator car according to the original floor calls, and the method ends at operation 810.

When, however, the number of floor calls is greater than the number of passengers, the elevator control module 102 notifies the passengers of a pending cancellation of one or more of the original floor calls at operation 812. At operation 814, a determination is made as to whether the passengers confirm the cancellation of an original floor call. If the passengers do not confirm the pending floor cancellation, the elevator control module 102 continues operating the elevator car according to the original floor calls, and the method ends at operation 810. When, however, the passengers do confirm the pending floor cancellation of an original floor call at operation 814, the elevator control module 102 assigns a new call request to one or more passengers and tracks the position of the passengers at operation 816. The method then ends at operation 810.

Figure 9:
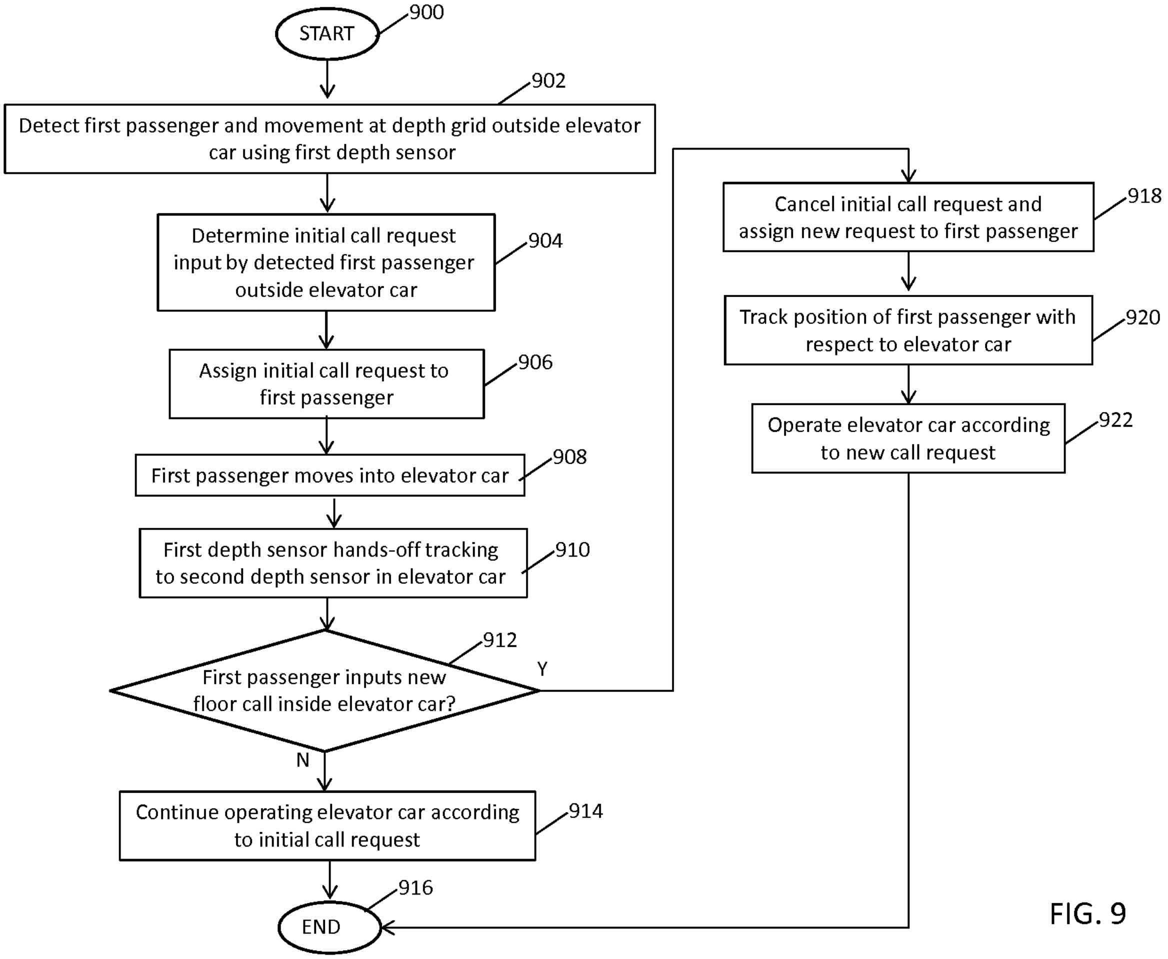

Turning now to FIG. 9, a method of controlling an elevator passenger tracking control system 100 is illustrated according to still another non-limiting embodiment. The method begins at operation 900, and at operation 902, a potential passenger is detected at an occupancy depth grid 117*a* via a first depth sensor 116*a* located at an elevator landing 120. At operation 904, an initial call request input to a call control device 110 by the potential passenger is detected. At operation 906, the initial call request is assigned to the first potential passenger. At operation 908, the first passenger moves from the first occupancy depth grid 117*a* into the elevator car 106 and into a second occupancy depth grid 117*b* within the elevator car 106. At operation 910, the first depth sensor 116*a* hands-off tracking of the passenger to a second depth sensor 116*b* installed within the elevator car 106.

At operation 912, a determination is made as to whether the potential passenger input a new elevator call after entering an occupancy depth grid 117*b* within elevator car 106 using the elevator car control device 108. If the potential passenger has not input a new elevator call, at operation 114 the elevator control module 102 continues operating the elevator car 106 according to the initial call request at operation 904, and the method ends at operation 916.

When, however, the potential passenger inputs a new elevator call after entering the occupancy depth grid 117*b* in the elevator car 106 at operation 912, the initial call request is cancelled and the new call request is assigned to the passenger at operation 918. At operation 920, the position of the passenger corresponding to the new call request with respect to the occupancy depth grid 117*b* of the elevator car 106 is tracked by the elevator control module 102. At operation 922, the elevator control module 102 operates the elevator control car 106 according to the new call request, and the method ends at operation 916.

Figure 10:
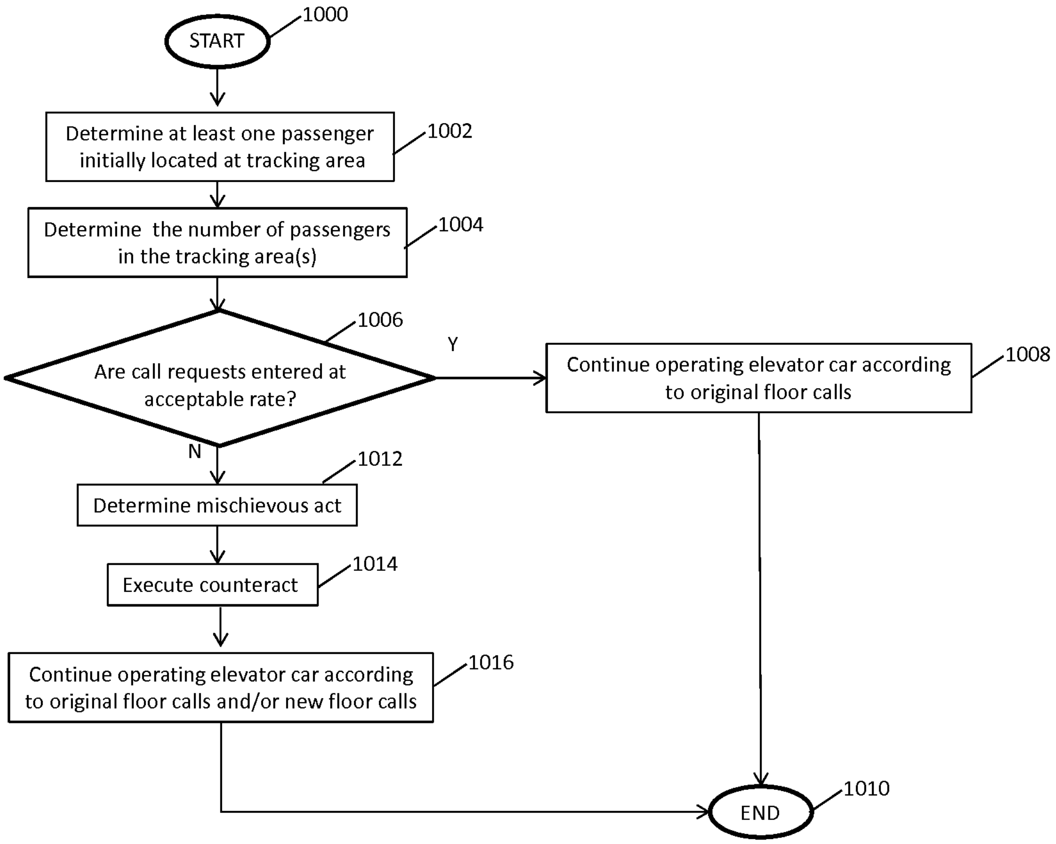

Referring now to FIG. 10, a method of controlling an elevator passenger tracking control system 100 is illustrated according to yet another non-limiting embodiment. The method begins at operation 1000, and at operation 1002, at least one passenger is initially detected in an occupancy depth grid 117*a* of an elevator car landing 120 or an occupancy depth grid 117*b* within an elevator car 106. At operation 1004, the number of passengers selecting destination floors is determined. At operation 1006, a determination is made as to whether a passenger inputs call requests at an acceptable rate. For example, the passenger may intend to execute a mischievous act by selecting all the elevator floors at once. The mischievous act may be determined, for example, by detecting the input of a plurality of floors e.g., 8 floors selected by one passenger, within a short time period, e.g., 5 seconds. When the call requests are input at an acceptable rate, the system continues operating the elevator car according to the original floor calls at operation 1008, and the method ends at operation 1010.

When, however, a mischievous act is determined at operation 1012, the system executes one or more counteractions at operation 1014 to counteract the mischievous act. According to an embodiment, the counteractions include, for example, denying all the call requests input at the unacceptable rate of a mischievous act. The determination of an acceptable rate may depend upon the number of tracked passengers selecting destination floors and the number of devices for selecting floors. For instance, when two distinct passengers are making floor selections at two separate devices, a high instantaneous, but not sustained, aggregate rate may be acceptable. Similarly, when only one passenger is making floor selections, only a low rate is acceptable. According to another embodiment, the counteractions include, for example, synchronously over-riding each call request with the following call request during a time period corresponding to an unacceptable rate. For example, the system 100 cancels the initial call request input during the time period of the mischievous act and replaces the initial call request with the second call request, while the second call request is canceled and replaced with the following third call request, etc. Once the counteraction is executed, the elevator system 100 continues operating according to the call request of any current passengers and/or a new call request at operation 1016, and the method ends at operation 1010.

Figure 11:
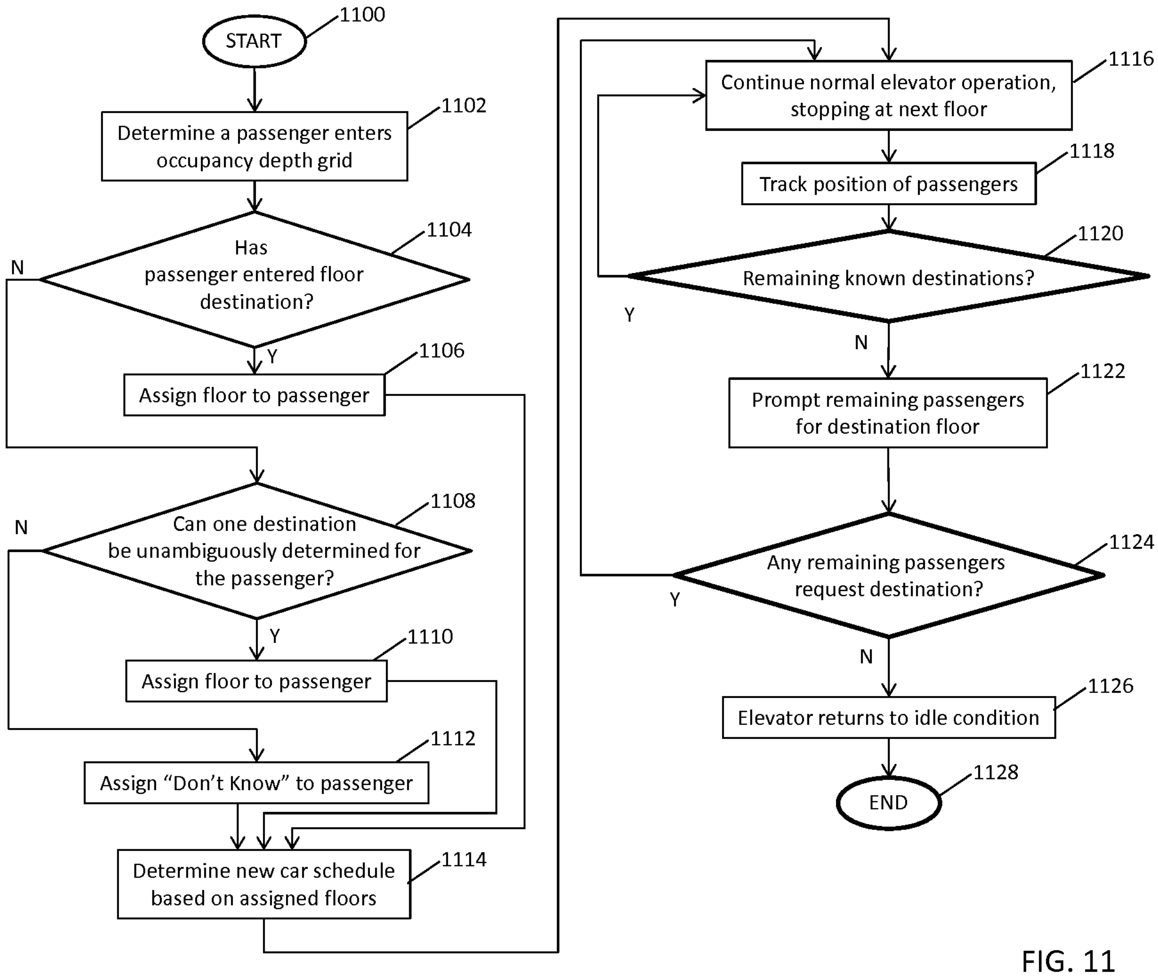

Referring now to FIG. 11, a method of controlling an elevator passenger tracking control system 100 is illustrated according to yet another non-limiting embodiment wherein the system 100 includes a method of operating the elevator car according to a "don't know" status when one or more passengers enter an occupancy depth grid 117*a*-117*b*, but do not enter a destination floor. For instance, the method begins at operation 1100, and at operation 1102, a passenger enters an occupancy depth grid at an elevator landing 117*a* or an occupancy depth grid within an elevator car 117*b* where the passenger has no previously assigned floor request. At operation 1104, the system determines whether the first passenger has entered a destination floor. If the passenger inputs a destination floor, operation continues at operation 1106 where the system assigns the input destination floor to the passenger. If no destination is entered, the operation continues at operation 1108. At operation 1108, it is determined if a destination floor may be unambiguously assigned to the first passenger. For instance, if exactly one floor request has been previously selected by other passenger(s). If so, then at operation 1110 that floor request may be unambiguously assigned to the passenger. Otherwise, operation continues at operation 1112. At operation 1112, where, e.g., zero or more than one floor requests have been previously selected, the system assigns a "don't know" status to the passenger. In a similar manner, any number of other passengers in an occupancy depth grid may have "don't know" status when they made no floor selection and no unambiguous floor assignment could be made.

Operation continues at operation 1114 where a new car schedule is determined. For example, if a first passenger inputs a destination of floor 5, a second passenger inputs a destination of floor 10, and a third passenger makes no selection, the system determines that the elevator car must be delivered first to floor 5, and then to floor 10 if the elevator car is located at floor lower than floor 5, or vice versa (i.e., first to floor 10 then to floor 5 if the elevator car is located at a floor higher than floor 10). At operation 1116 the elevator continues normal operation based on the car schedule and stops at the next floor.

At operation 1118 elevator control module 102 tracks the position(s) of passengers in occupancy depth grids 117*a* and 117*b*. At operation 1120 after any tracked passengers have debarked elevator car 106 and any new passengers have embarked, it is determined if any passengers have known destinations. For example, if the passenger assigned to floor 5 exits the occupancy depth grid, then the system removes floor 5 from the delivery car schedule and determines an updated elevator delivery car schedule based on the remaining known assigned floors. The system then proceeds with normal operation at operation 1116. If, however, at operation 1120 only passengers remain with "don't know" status (i.e., there are no remaining known destinations), the system may request a floor selection at operation 1122 by using a graphic user interface/graphic display, loudspeaker, or other common notification device. At operation 1124 it is determined if any passengers have requested a destination. If so, operation returns to operation 1116. Otherwise the elevator returns to an idle state at operation 1126 as is normally commanded by elevator control module 102, and the method ends at operation 1128. In an alternative embodiment, the system doesn't prompt the passenger(s) at operation 1112 and instead directly returns to an idle condition.

It should be appreciated that FIGS. 2-11 illustrate examples of various operations of the elevator passenger tracking control system according to non-limiting embodiments of the invention. Thus, the operations illustrated in FIGS. 2-11 should not be viewed as an exhaustive list and it should be appreciated that additional operations or process flows may be performed which are commensurate with the operation and capability of the elevator passenger tracking control system described in detail above.

It should further be appreciated that the teaching, while using an elevator for illustrative purposes, pertains to multiple kinds of passenger conveyance systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A passenger conveyance passenger tracking control system that controls operation of a passenger conveyance, comprising:

at least one call request device configured to receive at least one input from at least one passenger located at a occupancy depth grid;

at least one passenger position three-dimensional (3-D) depth-sensing sensor configured to track a position of the at least one passenger located at the occupancy depth grid; and an electronic control module in signal communication with the at least one call request device and the at least one passenger position 3-D depth-sensing sensor, the electronic control module configured to control operation of the passenger conveyance based on the position of the at least one passenger, wherein the electronic control module generates first and second occupancy depth grids identifying the position of the at least one passenger based on an electronic data signal output from the at least one passenger 3-D depth-sensing sensor, and controls operation of the passenger conveyance based on the position of the at least one passenger with respect to one or both of the first and second occupancy depth grids, wherein the at least one passenger is tracked in an area that includes the first occupancy depth grid located externally from the passenger conveyance and the second occupancy depth grid located within the passenger conveyance, and wherein the at least one passenger position 3-D depth-sensing sensor includes a first 3-D depth-sensing sensor configured to monitor the first occupancy depth grid, and a second 3-D depth-sensing sensor configured to monitor the second occupancy depth grid, and wherein the control module hands off at least one data monitored by the first 3-D depth-sensing sensor to the second 3-D depth-sensing sensor when at least one passenger moves from the first occupancy depth grid to the second occupancy depth grid, and data monitored by the second 3-D depth-sensing sensor to the first 3-D depth-sensing sensor when at least one passenger moves from the second occupancy depth grid to the first occupancy depth grid.

2. The passenger conveyance passenger tracking control system of claim 1, wherein the passenger conveyance control module cancels an passenger conveyance call request based on at least one of the position of the at least one passenger with respect to the at least one occupancy depth grid, and the time period at which the at least one passenger enters a plurality of call requests.

3. The passenger conveyance passenger tracking control system of claim 2, wherein the passenger conveyance control module cancels the passenger conveyance call request in response to the at least one passenger existing outside the at least one occupancy depth grid for a predetermined time period.

4. The passenger conveyance passenger tracking control system of claim 3, wherein the passenger conveyance control module is configured to recognize a plurality of passengers located in at least one of the first occupancy depth grid and the second occupancy depth grid, and is configured to assign at least one of a passenger conveyance call request to a passenger among the plurality of passengers, a plurality of possible direct call requests to a passenger among the plurality of passengers, and an indirect call request to a passenger among the plurality of passengers that indicates a passenger's request is ambiguous as to the desired floor of the passenger.

5. The passenger conveyance passenger tracking control system of claim 4, wherein the passenger conveyance control module cancels a passenger conveyance call request based on a first position of the first passenger and a second position of a second passenger among the plurality of passengers, the first and second positions compared to the second occupancy depth grid.

6. The passenger conveyance of claim 1, wherein the passenger conveyance is an elevator.

7. A method of controlling at least one passenger conveyance, the method comprising:

determining at least one passenger conveyance call request input by at least one passenger located in at least one occupancy depth grid via at least one call request device; tracking a position of the at least one passenger with respect to the at least one occupancy depth grid; and controlling operation of the passenger conveyance based on the position of the at least one passenger with respect to the at least one occupancy depth grid, receiving an electronic data signal from the at least one passenger 3-D depth-sensing sensor identifying the position of the at least one passenger and the location of the at least one occupancy depth grid, and controlling operation of the passenger conveyance based on the position of the at least one passenger with respect to the at least one occupancy depth grid; and monitoring a first occupancy depth grid located externally from a passenger conveyance system and monitoring a second occupancy depth grid located within the passenger conveyance, handing off at least one data monitored by a first 3-D depth-sensing sensor to a second 3-D depth-sensing sensor when at least one passenger moves from the first occupancy depth grid to the second occupancy depth grid, and data monitored by the second 3-D depth-sensing sensor to the first 3-D depth-sensing sensor when at least one passenger moves from the second occupancy depth grid to the first occupancy depth grid.

8. The method of claim 7, further comprising cancelling an passenger conveyance call request based on at least one of the position of the at least one passenger with respect to the at least one occupancy depth grid, and the time period at which the at least one passenger enters a plurality of call requests.

9. The method of claim 8, further comprising: determining a time period at which the at least one passenger is outside the at least one occupancy depth grid, and cancelling the passenger conveyance call request in response to the time period exceeding a time period threshold; and recognizing a plurality of passengers located in at least one of the first occupancy depth grid and the second occupancy depth grid, and assigning at least one of a passenger conveyance call request to a passenger among the plurality of passengers, a plurality of possible call requests to a passenger among the plurality of passengers, and an indirect call request to a passenger among the plurality of passengers that indicates a passenger's request is ambiguous as to the desired floor of the passenger.

10. The method of claim 9, further comprising:

determining a first position of the first passenger with respect to the second occupancy depth grid;

determining a second position of a second passenger among the plurality of passenger with respect to the second occupancy depth grid; and cancelling an passenger conveyance request based on a comparison between the first and second positions, and the second occupancy depth grid.

11. A passenger conveyance passenger tracking control system that controls operation of a passenger conveyance, comprising:

at least one call request device configured to receive at least one input from at least one passenger located at a occupancy depth grid;

at least one passenger position three-dimensional (3-D) depth-sensing sensor configured to track a position of the at least one passenger located at the occupancy depth grid; and an electronic control module in signal communication with the at least one call request device and the at least one passenger position 3-D depth-sensing sensor, the electronic control module configured to control operation of the passenger conveyance based on the position of the at least one passenger, wherein the electronic control module receives monitors a first occupancy depth grid located externally from a passenger conveyance system based on a first output signal generated by a first position three-dimensional (3-D) depth-sensing sensor among the at one passenger position three-dimensional (3-D) depth-sensing sensor, monitors a second occupancy depth grid located within the passenger conveyance based on a second output signal generated by a second position three-dimensional (3-D) depth-sensing sensor among the at one passenger position three-dimensional (3-D) depth-sensing sensor, and wherein the electronic control module hands off at least one data monitored by a first 3-D depth-sensing sensor to a second 3-D depth-sensing sensor when at least one passenger moves from the first occupancy depth grid to the second occupancy depth grid, and hands off data monitored by the second 3-D depth-sensing sensor to the first 3-D depth-sensing sensor when at least one passenger moves from the second occupancy depth grid to the first occupancy depth grid.

* * * * *